US009235062B1

(12) United States Patent
Desantiago

(10) Patent No.: US 9,235,062 B1
(45) Date of Patent: Jan. 12, 2016

(54) SHOOTING HEADWEAR

(71) Applicant: Jorge Desantiago, Taylorsville, UT (US)

(72) Inventor: Jorge Desantiago, Taylorsville, UT (US)

( * ) Notice: Subject to any disclaimer, the term of this patent is extended or adjusted under 35 U.S.C. 154(b) by 164 days.

(21) Appl. No.: 14/171,970

(22) Filed: Feb. 4, 2014

(51) Int. Cl.
    *G02C 9/00*     (2006.01)
    *G02C 5/00*     (2006.01)

(52) U.S. Cl.
    CPC ...................................... *G02C 5/003* (2013.01)

(58) Field of Classification Search
    CPC ....................................................... G02C 5/143
    USPC ........ 351/53, 158, 118, 119, 111; 2/209, 431; 381/183; 455/351; D29/112
    See application file for complete search history.

(56) References Cited

U.S. PATENT DOCUMENTS

| | | | |
|---|---|---|---|
| 4,856,089 A * | 8/1989 | Horton .................... | A61F 9/025 2/10 |
| 5,179,736 A | 1/1993 | Scanlon | |
| 5,252,069 A * | 10/1993 | Lamb ...................... | G09B 9/36 2/11 |
| 5,278,999 A | 1/1994 | Brown et al. | |
| D404,174 S | 1/1999 | Childs et al. | |
| 6,148,821 A | 11/2000 | Falco | |
| 7,025,061 B2 | 4/2006 | Haussmann | |
| 7,182,087 B1 | 2/2007 | Marsh | |
| 8,621,664 B2 * | 1/2014 | Peebles .................. | A61F 9/029 2/10 |
| 2009/0235437 A1 | 9/2009 | Springer et al. | |

* cited by examiner

*Primary Examiner* — Hung Dang
(74) *Attorney, Agent, or Firm* — Kyle A. Fletcher, Esq.

(57) ABSTRACT

The shooting headwear is constructed with a set of protective eyewear that is telescopically attached to a pair of protective earmuffs. The pair of protective earmuffs attach to one another via a tilting head strap that is rotatably engaged so as to adjust to the contours of the head of the end user. The earmuffs each include a set of detachable ear pads that enhance comfort and remove perspiration. The protective eyewear is placed across the ridge of the nose of the end user, and aids in securing the protective earmuffs directly onto the ears of the end user. The protective eyewear includes telescoping armatures that can adjust telescopically with respect to the protective earmuffs. Also, the telescoping armatures of the protective eyewear are able to pivot so as to adjust to the particulars of the end user.

20 Claims, 5 Drawing Sheets

SHOOTING HEADWEAR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of gun or firearm shooting, more specifically, a piece of headwear that is worn whilst shooting a gun or firearm.

SUMMARY OF THE INVENTION

An embodiment of the disclosure meets the needs presented above by generally comprising protective eyewear that is telescopically attached to a pair of protective earmuffs. The pair of protective earmuffs attach to one another via a tilting head strap that is rotatably engaged so as to adjust to the contours of the head of the end user. The earmuffs each include a set of detachable ear pads that enhance comfort and remove perspiration. The protective eyewear is configured to be placed across the ridge of the nose of the end user, and aids in securing the protective earmuffs directly onto the ears of the end user. The protective eyewear includes telescoping armatures that can adjust telescopically with respect to the protective earmuffs. Also, the telescoping armatures of the protective eyewear are able to pivot so as to adjust to the particulars of the end user.

An object of the invention is to provide a device that is able to protect the eyes and ears of an end user whilst shooting firearms, guns, sporting clays, etc.

An even further object of the invention is for the headwear to include eyewear that connects to the earmuffs directly.

Another object of the invention is for the eyewear to telescopically adjust with respect to the earmuffs so as to accommodate differently sized end users.

Another object of the invention is for the eyewear to pivot with respect to the earmuffs so as to accommodate differently sized end users.

Another object of the invention is for the earmuffs to include a titling head strap that can pivot with respect to the earmuffs so as to accommodate differently sized end users.

Another object of the invention is for the earmuffs to include a set of detachable ear pads that enhance comfort, and remove excess perspiration.

These together with additional objects, features and advantages of the shooting headwear will be readily apparent to those of ordinary skill in the art upon reading the following detailed description of presently preferred, but nonetheless illustrative, embodiments of the shooting headwear when taken in conjunction with the accompanying drawings.

In this respect, before explaining the current embodiments of the shooting headwear in detail, it is to be understood that the shooting headwear is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the shooting headwear.

It is therefore important that the claims be regarded as including such equivalent construction insofar as they do not depart from the spirit and scope of the shooting headwear. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
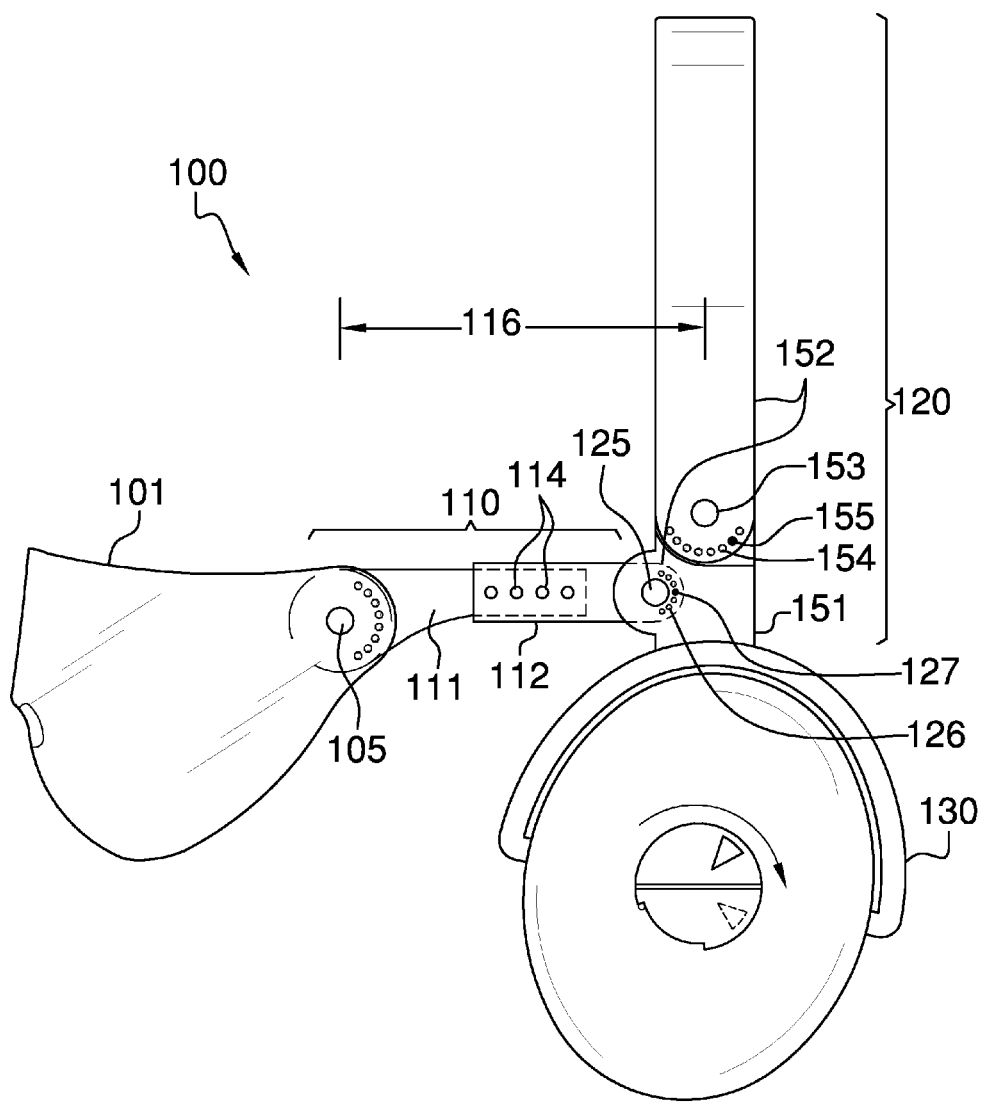
FIG. 1 is a side view of the shooting headwear.
Figure 2:
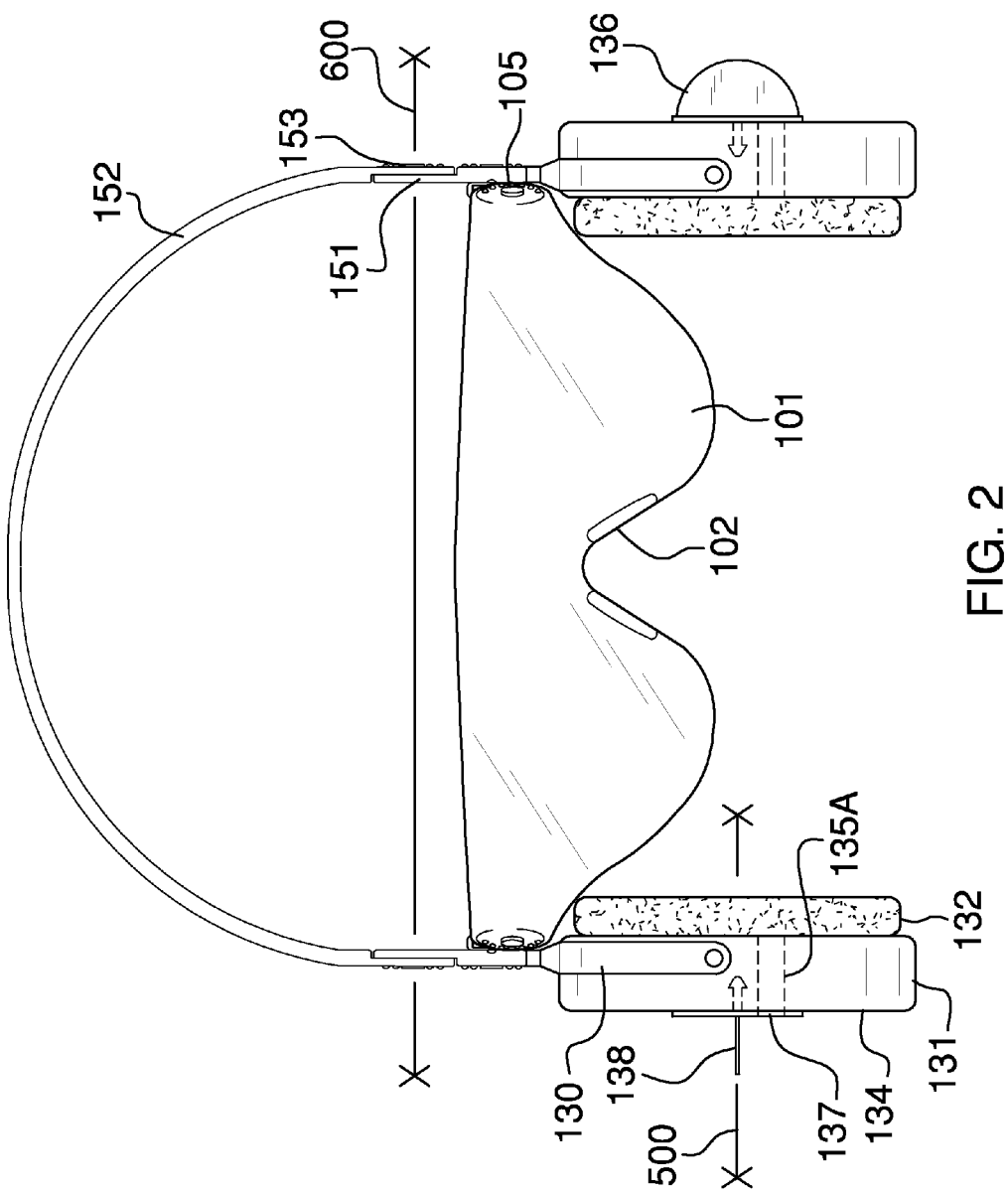
FIG. 2 is a front view of the shooting headwear.
Figure 3:
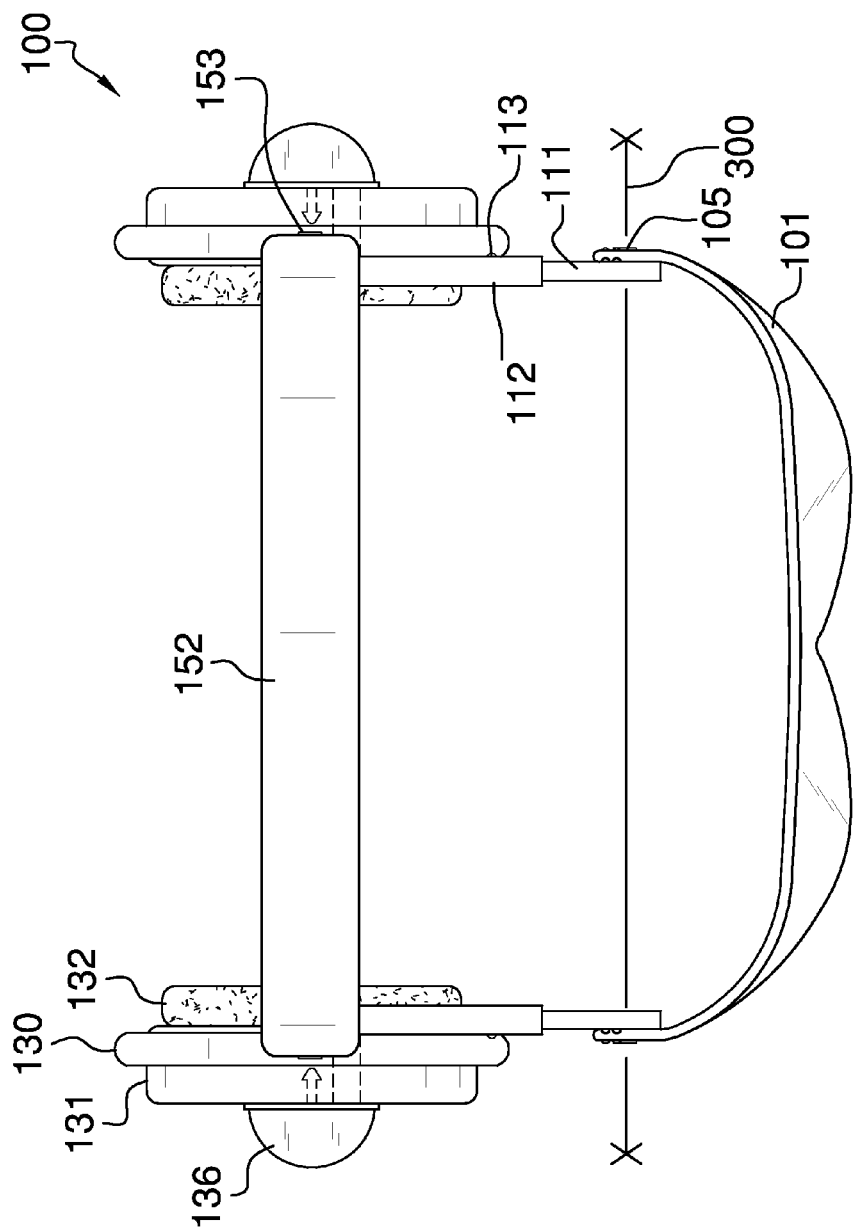
FIG. 3 is a top view of the shooting headwear.
Figure 4:
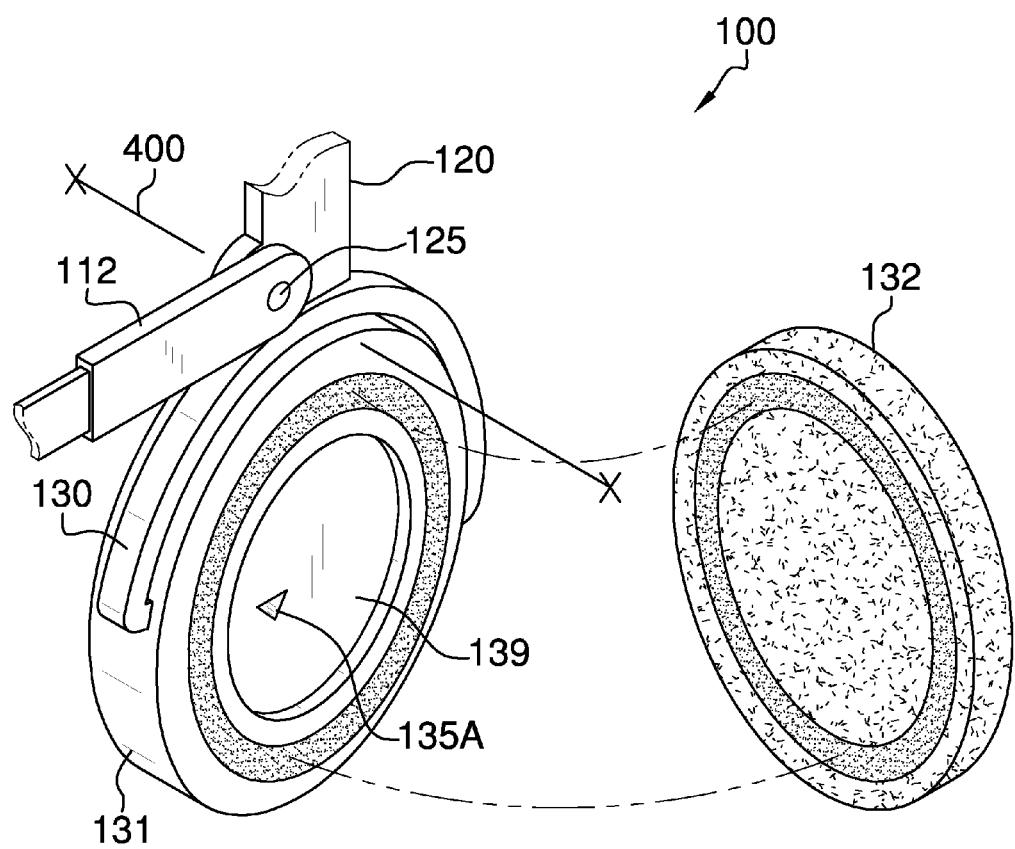
FIG. 4 is a detailed view of the detachable ear pad exploded from one of the earmuffs.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 5, the shooting headwear 100 (hereinafter invention) is further comprised of a protective eyewear 101 that includes a nose ridge 102 configured to rest upon a nose 201 of an end user 200. The protective eyewear 101 is configured to protect eyes 199 of the end user 200, and includes telescoping armatures 110 that extend to the sides of a head 202 of the end user 200. The telescoping armatures 110 connect with the protective eyewear 101 at a first eyewear pivot point 105, which enables the protective eyewear 101 to pivot with respect to the telescoping armatures 110 about a first eyewear pivot axis 300.

The telescoping armatures 110 are each further defined with a first telescoping member 111 that actually connects with the eyewear pivot point 105. A second telescoping member 112 enables the first telescoping member 111 to extend and retract therefrom. The second telescoping member 112 connects with a tilting head strap 120 at a second eyewear pivot point 125. The second eyewear pivot point 125 enables the telescoping armatures 110 and the protective eyewear 101 to collectively pivot with respect to the tilting head strap 120 via a second eyewear pivot axis 400. The first telescoping member 111 includes a nodule 113 that interacts with one of a plurality of linearly aligned holes 114 to enable adjustment of a telescoping armature length 116.

The tilting head strap 120 is further defined as a "U" shaped member that includes an earmuff bracket 130 at distal ends to enable securement of a pair of protective earmuffs 131 thereto. The protective earmuffs 131 are each configured to rest against ears 203 of the end user 200, and to eliminate or reduce the sound decibel of noises associated with shooting firearms, such as guns, rifles, sport clay shooting, hunting, etc.

The protective earmuffs 131 are each provided a detachable ear pad 132 that enhances comfort to the end user 200, and also absorbs any perspiration from the ears 203. That being said, the detachable ear pads 132 are each sandwiched in between the respective earmuff 131 and the respective ear 203 of the end user 202. The detachable ear pads 132 are each constructed of an visco-elastic foam that is covered in a cotton lining.

The protective earmuffs 131 are each further defined with an exterior surface 134 that includes a hearing port 135 integrated thereon. The hearing port 135 is essentially a small hole that enables sound from the exterior to enter through the hearing port 135 and to the respective ear 203 of the end user 202. The hearing port 135 is the surface exposure of a hearing port conduit 135A that extends from the exterior surface 134 through the protective earmuff 131, and to an interior surface 139 of the protective earmuff 131.

The protective earmuffs 131 also include a rotating knob 136 that pivots about a hearing port axis 500 in order to expose or close off the hearing port 135. Moreover, the rotating knob 136 is a conically-shaped appendage with a recess 137 removed that when aligned with the hearing port 135 enables sound to enter into the respective protective earmuff 135.

The rotating knob 136 may be removed, and exchanged for a closed plug 138 that when installed provides a visual indication that the hearing port 135 is closed. Moreover, the closed plug 138 essentially closes off the hearing port 135.

The tilting head strap 120 is further defined with a first tilting head strap member 151 and a second tilting head strap member 152. The first tilting head strap member 151 pivots with respect to the second tilting head strap member 152 at a tilting head strap pivot point 153. Moreover, the first tilting head strap member 151 pivots with respect to the second tilting head strap member 152 at a tilting head strap axis 600.

Figure 5:
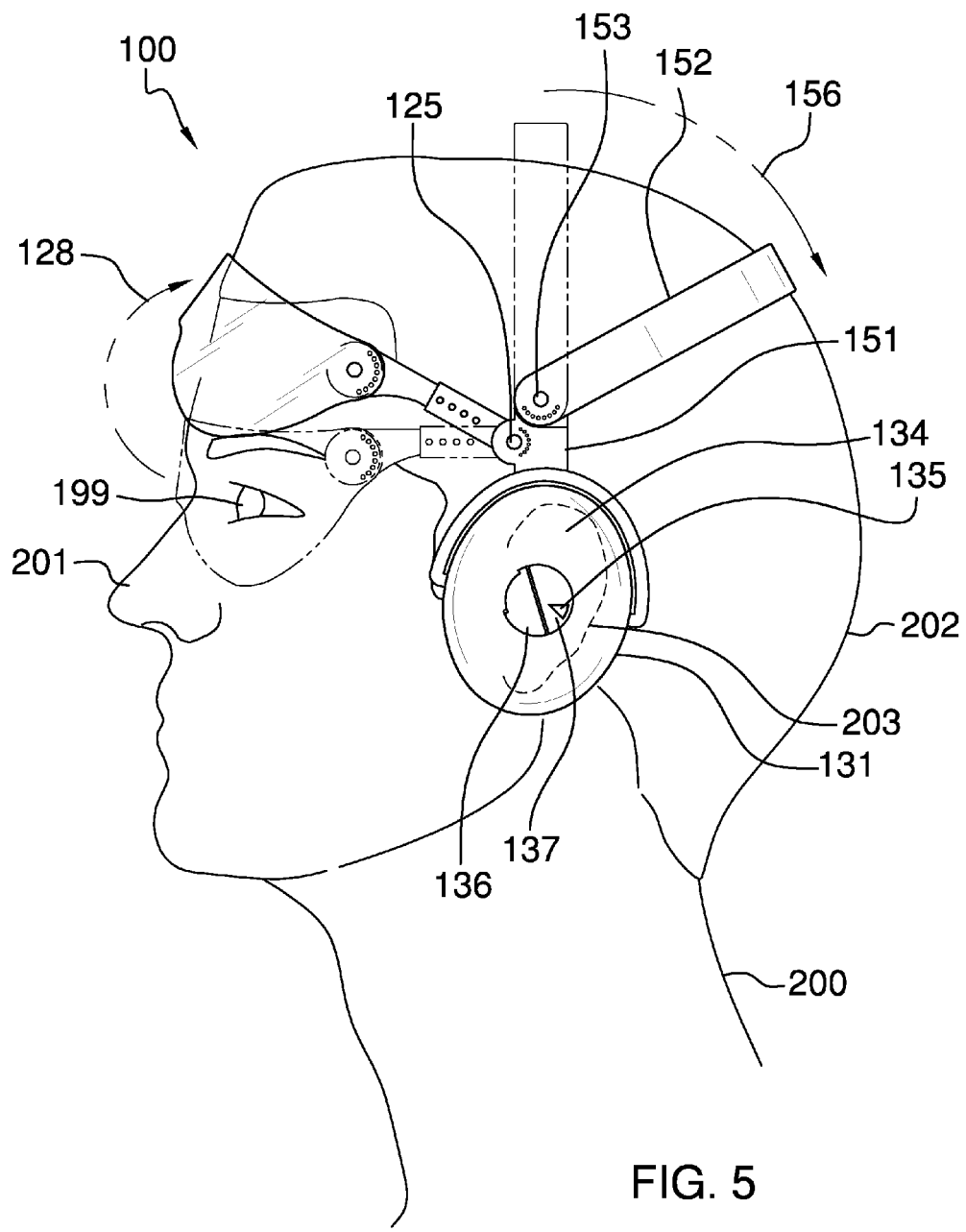
FIG. 5 is a view of the shooting headwear in use, and depicting rotation of the titling head strap as well as rotation of the eyewear.

In referencing FIG. 5, the second tilting head strap member 152 is able to rotate with respect to the head 202 of the end user 200 via the tilting head strap axis 600 and tilting head strap pivot point 153.

It shall be noted that the tilting head strap pivot point 153 shall include a plurality of head strap holes 154 that form a curvature. The first tilting head strap member 151 includes a head strap nodule 155. The head strap nodule 155 interacts with the head strap holes 154 in order to adjust a head strap angle 156. The head strap holes 154 and the head strap nodule 155 operate in a manner consistent with the nodule 113 and plurality of linearly aligned holes 114.

It shall be further noted that the first tilting head strap member 151 includes a plurality of eyewear holes 126. The second eyewear pivot point 125 includes a second nodule 127 that interacts with the eyewear holes 126 to adjust an eyewear angle 128.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A shooting headwear comprising:
   protective eyewear configured to protect eyes of an end user from debris associated with shooting firearms;
   said protective eyewear is telescopically engaged with respect to a tilting head strap, which includes protective earmuffs configured to rest against ears of the end user, and which protect said ears from damage due to sounds associated with shooting firearms.

2. The shooting headwear according to claim 1 wherein the protective eyewear that includes a nose ridge configured to rest upon a nose of the end user.

3. The shooting headwear according to claim 2 wherein the protective eyewear includes telescoping armatures that are configured to extend to the sides of a head of the end user; wherein the telescoping armatures connect with the protective eyewear at a first eyewear pivot point, which enables the protective eyewear to pivot with respect to the telescoping armatures about a first eyewear pivot axis.

4. The shooting headwear according to claim 3 wherein the telescoping armatures are each further defined with a first telescoping member that connects with the eyewear pivot point; wherein a second telescoping member enables the first telescoping member to extend and retract there from.

5. The shooting headwear according to claim 4 wherein the second telescoping member connects with the tilting head strap at a second eyewear pivot point; wherein the second eyewear pivot point enables the telescoping armatures and the protective eyewear to collectively pivot with respect to the tilting head strap via a second eyewear pivot axis.

6. The shooting headwear according to claim 5 wherein the first telescoping member includes a nodule that interacts with one of a plurality of linearly aligned holes to enable adjustment of a telescoping armature length.

7. The shooting headwear according to claim 6 wherein the tilting head strap is further defined as a "U" shaped member that includes an earmuff bracket at distal ends to enable securement of the pair of protective earmuffs thereto.

8. The shooting headwear according to claim 7 wherein the protective earmuffs are each provided a detachable ear pad that is sandwiched in between the respective earmuff and the respective ear of the end user; wherein the detachable ear pads are each constructed of a visco-elastic foam that is covered in a cotton lining.

9. The shooting headwear according to claim 8 wherein the protective earmuffs are each further defined with an exterior surface that includes a hearing port integrated thereon; wherein the hearing port is a small hole that enables sound from the exterior to enter through the hearing port across a hearing port conduit, and to the respective ear of the end user; wherein the hearing port conduit extends from the exterior surface through the protective earmuff, and to an interior surface of the protective earmuff.

10. The shooting headwear according to claim 9 wherein the protective earmuffs includes a rotating knob that pivots about a hearing port axis in order to expose or close off the hearing port; wherein the rotating knob is a conically-shaped appendage with a recess removed that when aligned with the hearing port enables sound to enter into the respective protective earmuff.

11. The shooting headwear according to claim 10 wherein the tilting head strap is further defined with a first tilting head strap member and a second tilting head strap member; wherein the first tilting head strap member pivots with respect to the second tilting head strap member at a tilting head strap pivot point.

12. The shooting headwear according to claim 11 wherein the rotating knob is removed, and a closed plug is into the hearing port in order to close off the hearing port.

13. The shooting headwear according to claim 12 wherein the tilting head strap pivot point includes a plurality of head strap holes that form a curvature; wherein the first tilting head strap member includes a head strap nodule; wherein the head strap nodule interacts with the head strap holes in order to adjust a head strap angle.

14. The shooting headwear according to claim 13 wherein the first tilting head strap member includes a plurality of eyewear holes; wherein the second eyewear pivot point includes a second nodule that interacts with the eyewear holes to adjust an eyewear angle.

15. A shooting headwear comprising:
protective eyewear configured to protect eyes of an end user from debris associated with shooting firearms;
said protective eyewear is telescopically engaged with respect to a tilting head strap, which includes protective earmuffs configured to rest against ears of the end user, and which protect said ears from damage due to sounds associated with shooting firearms;
wherein the protective eyewear that includes a nose ridge configured to rest upon a nose of the end user;
wherein the protective eyewear includes telescoping armatures that are configured to extend to the sides of a head of the end user; wherein the telescoping armatures connect with the protective eyewear at a first eyewear pivot point, which enables the protective eyewear to pivot with respect to the telescoping armatures about a first eyewear pivot axis;
wherein the telescoping armatures are each further defined with a first telescoping member that connects with the eyewear pivot point; wherein a second telescoping member enables the first telescoping member to extend and retract there from;
wherein the second telescoping member connects with the tilting head strap at a second eyewear pivot point;
wherein the second eyewear pivot point enables the telescoping armatures and the protective eyewear to collectively pivot with respect to the tilting head strap via a second eyewear pivot axis.

16. The shooting headwear according to claim 15 wherein the first telescoping member includes a nodule that interacts with one of a plurality of linearly aligned holes to enable adjustment of a telescoping armature length; wherein the tilting head strap is further defined as a "U" shaped member that includes an earmuff bracket at distal ends to enable securement of the pair of protective earmuffs thereto.

17. The shooting headwear according to claim 16 wherein the protective earmuffs are each provided a detachable ear pad that is sandwiched in between the respective earmuff and the respective ear of the end user; wherein the detachable ear pads are each constructed of a visco-elastic foam that is covered in a cotton lining.

18. The shooting headwear according to claim 17 wherein the protective earmuffs are each further defined with an exterior surface that includes a hearing port integrated thereon; wherein the hearing port is a small hole that enables sound from the exterior to enter through the hearing port across a hearing port conduit, and to the respective ear of the end user; wherein the hearing port conduit extends from the exterior surface through the protective earmuff, and to an interior surface of the protective earmuff.

19. The shooting headwear according to claim 18 wherein the protective earmuffs includes a rotating knob that pivots about a hearing port axis in order to expose or close off the hearing port; wherein the rotating knob is a conically-shaped appendage with a recess removed that when aligned with the hearing port enables sound to enter into the respective protective earmuff; wherein the tilting head strap is further defined with a first tilting head strap member and a second tilting head strap member; wherein the first tilting head strap member pivots with respect to the second tilting head strap member at a tilting head strap pivot point; wherein the rotating knob is removed, and a closed plug is into the hearing port in order to close off the hearing port.

20. The shooting headwear according to claim 19 wherein the tilting head strap pivot point includes a plurality of head strap holes that form a curvature; wherein the first tilting head strap member includes a head strap nodule; wherein the head strap nodule interacts with the head strap holes in order to adjust a head strap angle; wherein the first tilting head strap member includes a plurality of eyewear holes; wherein the second eyewear pivot point includes a second nodule that interacts with the eyewear holes to adjust an eyewear angle.

* * * * *